(12) United States Patent
Iwahashi et al.

(10) Patent No.: US 11,349,770 B2
(45) Date of Patent: May 31, 2022

(54) COMMUNICATION CONTROL APPARATUS, AND COMMUNICATION CONTROL METHOD

(71) Applicant: Nippon Telegraph and Telephone Corporation, Tokyo (JP)

(72) Inventors: Hiroki Iwahashi, Musashino (JP); Hidetaka Nishihara, Musashino (JP); Kaori Kurita, Musashino (JP); Kazuhiro Matsuo, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/429,121

(22) PCT Filed: Jan. 23, 2020

(86) PCT No.: PCT/JP2020/002338
§ 371 (c)(1),
(2) Date: Aug. 6, 2021

(87) PCT Pub. No.: WO2020/162208
PCT Pub. Date: Aug. 13, 2020

(65) Prior Publication Data
US 2022/0038383 A1    Feb. 3, 2022

(30) Foreign Application Priority Data

Feb. 7, 2019 (JP) ............................. JP2019-020371

(51) Int. Cl.
*H04L 47/41* (2022.01)
*H04L 43/0882* (2022.01)
(Continued)

(52) U.S. Cl.
CPC .......... *H04L 47/41* (2013.01); *H04L 43/0882* (2013.01); *H04L 47/20* (2013.01); *H04L 47/22* (2013.01)

(58) Field of Classification Search
None
See application file for complete search history.

(56) References Cited

U.S. PATENT DOCUMENTS

2003/0218976 A1* 11/2003 Kumazawa ............. H04L 47/10
                                                      370/392
2011/0242994 A1* 10/2011 Carvalho ............. H04L 43/026
                                                      370/252
(Continued)

FOREIGN PATENT DOCUMENTS

JP        2016042679        3/2016

*Primary Examiner* — Joshua Joo
(74) *Attorney, Agent, or Firm* — Fish & Richardson P.C.

(57) ABSTRACT

A communication control device specifies the top N flows in descending order of communication amounts input to a communication line as flows that are communication band limit targets, and limits a communication band of a group of flows that are the communication band limit targets to a predetermined limited band so that a sum of communication amounts of the flows input to the communication line is equal to or smaller than a predetermined line capacity. Here, the communication control device determines a value of N so that a limited band is equal to or larger than a communication amount of a flow having the largest communication amount in a group of flows that are not the communication band limit targets and is equal to or smaller than a communication amount of a flow having the smallest communication amount in the group of flows that are the communication band limit target.

4 Claims, 9 Drawing Sheets

(51) Int. Cl.
*H04L 47/20* (2022.01)
*H04L 47/22* (2022.01)

(56) References Cited

U.S. PATENT DOCUMENTS

| | | | |
|---|---|---|---|
| 2014/0153388 A1* | 6/2014 | Webb | H04L 47/20 370/230 |
| 2015/0333994 A1* | 11/2015 | Gell | G06F 3/0643 709/224 |
| 2016/0261339 A1* | 9/2016 | Kitamura | H04L 47/745 |

* cited by examiner

| REGISTRATION NUMBER (i) OF FLOW | IP ADDRESS | NUMBER OF PACKETS | PACKET LENGTH | AMOUNT OF DATA | INFLOW BAND ($U_i$) |
|---|---|---|---|---|---|
| 1 | | | | | |
| 2 | | | | | |
| ... | | | | | |
| N | | | | | |
| ... | | | | | |
| ... | | | | | |

(b)

| |
|---|
| SUM OF INFLOW BANDS OF ALL FLOWS ($U_a$) |
| SUM OF INFLOW BANDS OF TOP N FLOWS ($U_u$) |
| BAND (B) OF OUTGOING LINE |
| EXCEEDED BAND ($U_e = U_a - B$) |

COMMUNICATION CONTROL APPARATUS, AND COMMUNICATION CONTROL METHOD

CROSS-REFERENCE TO RELATED APPLICATIONS

This application is a National Stage application under 35 U.S.C. § 371 of International Application No. PCT/JP2020/002338, having an International Filing Date of Jan. 23, 2020, which claims priority to Japanese Application Serial No. 2019-020371, filed on Feb. 7, 2019. The disclosure of the prior application is considered part of the disclosure of this application, and is incorporated in its entirety into this application.

TECHNICAL FIELD

The present invention relates to a communication control device and a communication control method.

BACKGROUND ART

In a best effort communication line, when a sum of communication amounts of an incoming line exceeds a capacity of an outgoing line, packets are transferred from the outgoing line in a band proportional to the communication amount of the incoming line because the packets are transferred in order of arrival.

For example, a case in which a capacity of an outgoing line of a best effort communication line is 20 Mpps, a flow of user A is input at 20 Mpps, a flow of user B is input at 12 Mpps, and a flow of user C is input at 2 Mpps from an incoming line is considered. In this case, the sum of the communication amounts of the incoming line in the communication line is 34 Mpps, which exceeds the capacity (20 Mpps) of the outgoing line. Therefore, the flow of each user is transferred from the outgoing line in a band proportional to the communication amount of the incoming line, that is, the flow of user A is transferred at 11.8 Mpps, the flow of user B is transferred at 7.0 Mpps, and the flow of user C is transferred at 1.2 Mpps. As a result, although the flow of user C has a small communication amount (2.0 Mpps), the communication band is reduced due to an influence of the flows of users A and B having a large communication amount.

Here, there is a technology for limiting a communication band of a flow of a user having a large communication amount on the basis of statistical values of communication amounts of flows of respective users in order to control the communication band allocated to the outgoing line so that the communication band is as fair as possible among the users in a best-effort communication line. Further, there is a technology for allocating a part of the communication band of an outgoing line of a communication line to flows of respective users on average and operating a remaining communication band with best effort (see PTL 1).

CITATION LIST

Patent Literature

[PTL 1] Japanese Patent Application Publication No. 2016-042679

SUMMARY OF THE INVENTION

Technical Problem

Here, a method of setting the top N flows in descending order of a communication amount of the flows as communication band limit targets and not setting the other flows as communication band limit targets in order to avoid limiting a communication band for a flow of a user having a small communication amount is also conceivable. However, this method is likely to degrade use efficiency of the communication line when the number of limit target flows is too large, and to perform extreme communication limitation on the limit target flow when the number of limit target flows is too small.

This will be described with reference to FIG. 9. Here, when a sum of communication amounts of the respective flows exceeds a line capacity, the top N flows in descending order of communication amounts of the flows are set as communication band limit targets. Here, a limited band of each flow is (line capacity—(communication band of flows other than communication band limit targets))/N. In this case, when the number of limit target flows is too large (for example, N=10), there are flows of which a communication amount has not reached the limited band, and thus the use efficiency of the communication line is degraded. Further, when the number of limit target flows is insufficient (for example, N=2), there is a problem that the limited band becomes much smaller than the communication amount of the limit target flows.

Therefore, an object of the present invention is to solve the above-described problem and appropriately perform limitation on a communication band of each flow in a best effort communication line.

Means for Solving the Problem

In order to solve the above-described problem, the present invention is a communication control device for performing control of communication bands of flows, the communication control device including: a monitoring unit configured to monitor communication amounts for the respective flows input to a communication line at a predetermined cycle; a flow specifying unit configured to specify the top N flows in descending order of the communication amounts input to the communication line as flows that are communication band limit targets when a sum of the monitored communication amounts of the respective flows exceeds the predetermined line capacity; a number-of-limit-target-flows determination unit configured to set a value obtained by dividing a difference between the predetermined line capacity and a sum of communication bands of a group of flows that are not the communication band limit targets by N as a limited band of the group of limit target flows, and determine a value of N so that the limited band is equal to or larger than a communication amount of a flow having the largest communication amount in the group of flows that are not the communication band limit targets and is equal to or smaller than a communication amount of a flow having the smallest communication amount in the group of flows that are the communication band limit targets; and a band control unit configured to limit the communication band of a group of the specified flows that are the communication band limit targets to the limited band.

Effects of the Invention

According to the present invention, it is possible to appropriately perform limitation on a communication band of each flow in a best effort communication line.

BRIEF DESCRIPTION OF DRAWINGS

FIG. 4 is a diagram illustrating an example of statistical information in FIG. 3.

DESCRIPTION OF EMBODIMENTS

Hereinafter, a mode (embodiment) for carrying out the present invention will be described with reference to the drawings. The present invention is not limited to an embodiment to be described below.

[Overview]

First, an overview of a communication control device of the embodiment will be described with reference to FIGS. 1 and 2. The communication control device to be described below controls a communication band of a best effort communication line, such as a band of a flow flowing through the communication line. This communication control device is realized by, for example, a switch or a router.

The communication control device monitors, for example, communication amounts of flows of respective users input to the best effort communication line in a predetermined monitoring cycle (T). When a sum of the communication amounts of the flows of the respective users in the monitoring cycle (T) exceeds a line capacity of an outgoing line of the communication line, the communication control device limits communication bands of the top N flows of the users in descending order of communication amounts to the same band (limited band).

Figure 1:
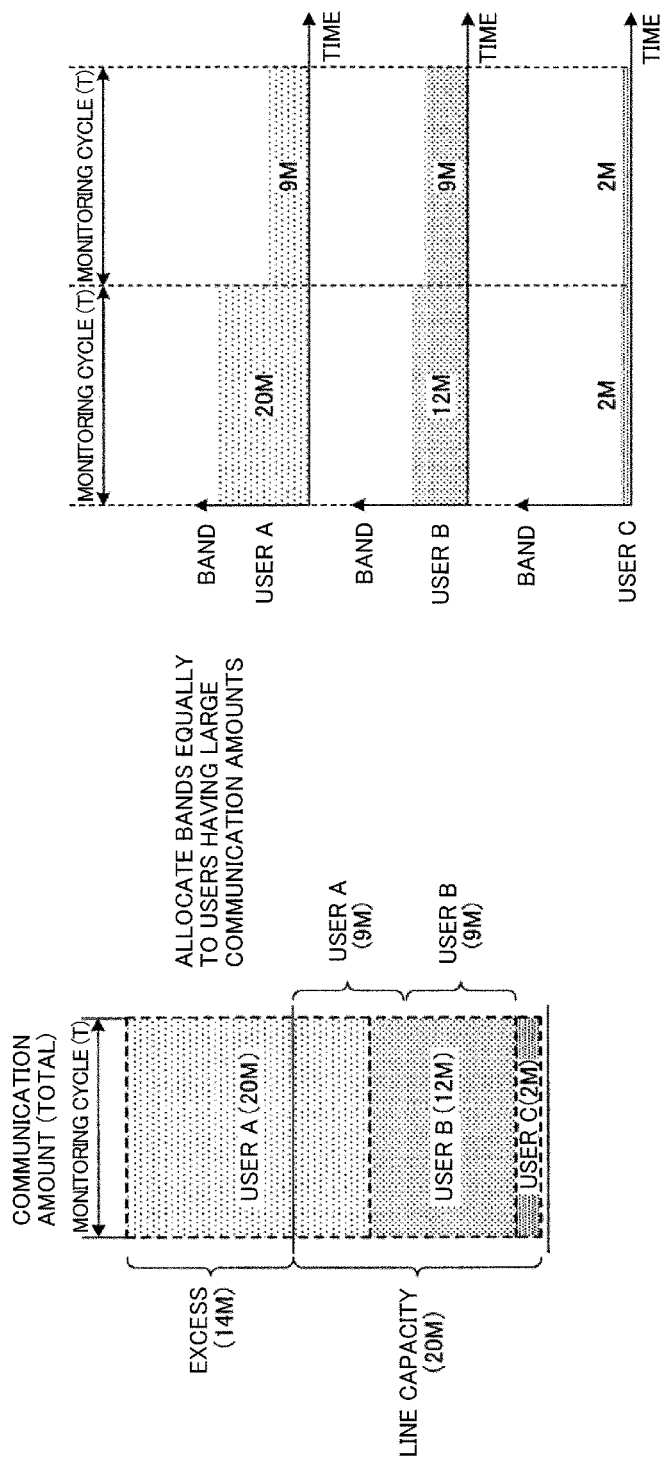
FIG. 1 is a diagram illustrating an overview of a communication control device.

For example, in the communication control device, a case in which the line capacity is 20M (bps), a communication amount of a flow of user A is 20M (bps), a communication amount of a flow of user B is 12M (bps), and a communication amount of user C is 2M (bps), as illustrated in FIG. 1, is considered. In this case, a band (20M (bps)–2M (bps)) that is not allocated to user C in the line capacity (20M (bps)) is equally allocated to users (for example, the top two users A and B) having a large communication amount. That is, the communication control device limits the communication bands of the flows of users A and B to (20M (bps)–2 (bps))/2=9M (bps). On the other hand, the communication control device does not limit the communication band of the flow (2M (bps)) of user C of whom the communication amount is smaller than that of the second-ranked flow.

Here, the communication control device determines whether or not the limited band in a case in which the number of limit target flows is N satisfies conditions (1) and (2) below. When either of the conditions (1) and (2) is not satisfied, the communication control device increments or decrements N and determines whether or not the conditions (1) and (2) are satisfied again to search for an optimal value of N.

Condition (1): The limited band is equal to or larger than a communication amount of the flow having the largest communication amount in a group of flows that are not set as communication band limit targets.

Condition (2): The limited band is equal to or smaller than a communication amount of the flow having the smallest communication amount in a group of flows that are set as communication band limit targets.

Figure 2:
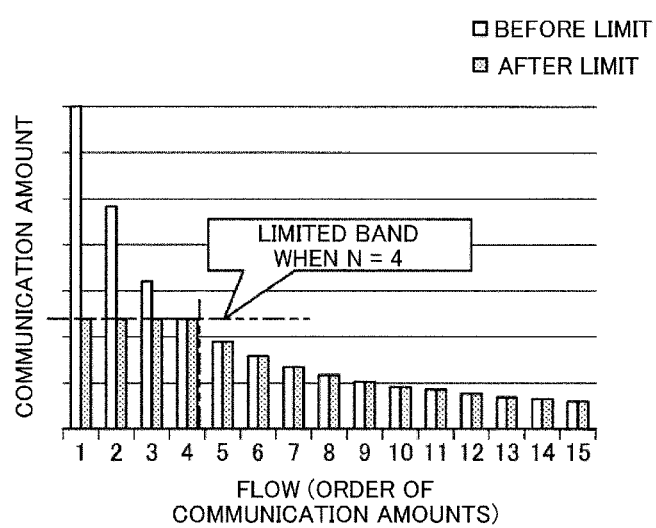
FIG. 2 is a diagram illustrating an overview of the communication control device.

For example, the communication control device searches for a value of N (for example, N=4) satisfying the conditions (1) and (2) by incrementing or decrementing N while performing the determination process on a group of flows (1 to 15) having communication amounts illustrated in FIG. 2. That is, a limited band in a case in which the communication control device sets the top 4 flows in descending order of communication amounts as the communication band limit targets is equal to or more than the largest communication amount (a communication amount of flow 5) among the communication amounts of the group of flows (flows 5 to 15) that are not set as the limit targets. Further, the limited band is equal to or smaller than the smallest communication amount (a communication amount of flow 4) among the communication amounts of a group of flows (flows 1 to 4) that are limit targets. That is, a limited band when N=4 satisfies the conditions (1) and (2). Therefore, the communication control device sets the top 4 flows in descending order of communication amounts as communication band limit targets.

Thus, the communication control device can prevent use efficiency of the communication line from being degraded when the communication band of each flow is limited, and also prevent an extreme communication limitation on the limit target flow. That is, the communication control device can appropriately limit the communication band of each flow. Further, since the communication control device automatically optimizes the number (N) of limit target flows, it is not necessary for an operator to tune the number (N) of limit target flows.

[Configuration]

Figure 3:
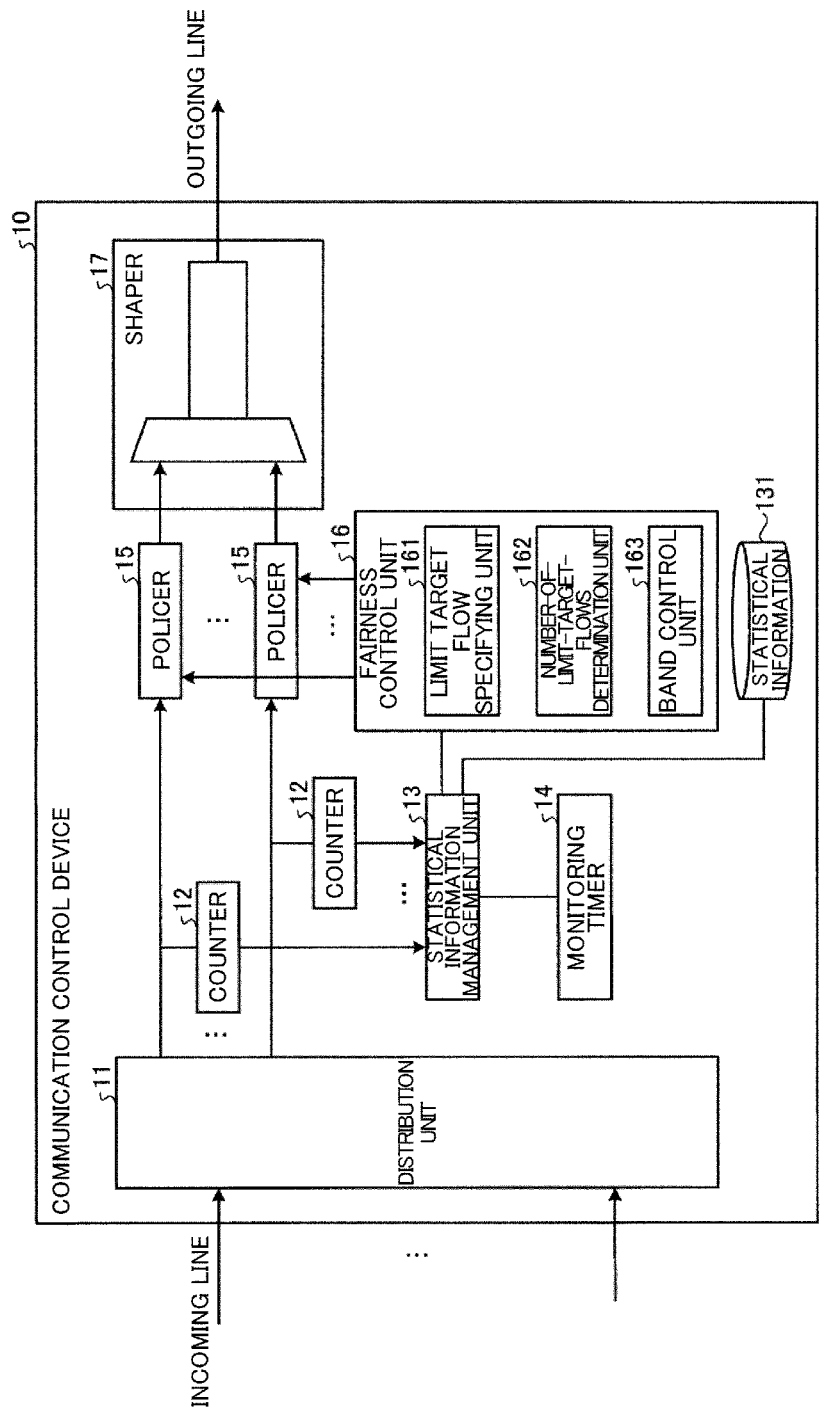
FIG. 3 is a diagram illustrating a configuration example of the communication control device.

Next, a configuration example of a communication control device 10 will be described with reference to FIG. 3. The communication control device 10 includes a distribution unit 11, a counter 12, a statistical information management unit (monitoring unit) 13, a monitoring timer 14, a policer 15, a fairness control unit 16, and a shaper 17.

The distribution unit 11 distributes packets from a plurality of incoming lines to the same outgoing line in units of flows according to an IP address or the like. The distributed packets are input to the policer 15.

The counter 12 measures a communication amount (for example, the number of packets and or amount of data) of the flow in units of flows.

The statistical information management unit 13 monitors the communication amount of each flow in a predetermined monitoring cycle. Specifically, the statistical information management unit 13 monitors the communication amount of each flow using the counter 12 until the monitoring timer 14 notifies the statistical information management unit 13 of expiration of the monitoring cycle, and records a result thereof in statistical information 131. The statistical information management unit 13 notifies the fairness control unit 16 of information indicating the communication amount of each flow in the statistical information 131 (see (a) of FIG. 4).

The monitoring timer 14 holds a time serving as the monitoring cycle, and notifies the statistical information management unit 13 of the expiration of the monitoring cycle each time the monitoring cycle expires.

The statistical information 131 is information indicating the communication amount of each flow in the monitoring cycle. The statistical information 131 includes, for example, an IP address of the flow, the number of packets of the flow, a packet length, an amount of data, an inflow band (Ui), and the like in the monitoring cycle, for each registration number (i) of the flow, as illustrated in FIG. 4(*a*). The statistical information 131 may also include, for example, a sum of inflow bands of all the flows (a sum band of the respective flows; Ua), a sum (Uu) of inflow bands of the top N flows, a band (B) of an outgoing line of the communication line, and an exceeded band (Ue=Ua−B), as illustrated in FIG. 4(*b*).

The description will now return to FIG. 3. The policer 15 performs policing on the packets of the flow on the basis of the control from the fairness control unit 16.

When a sum of communication amounts of the respective flows in the above monitoring cycle exceeds a predetermined threshold value (for example, the capacity of the outgoing line), the fairness control unit 16 performs limitation on the communication band for the top N flows in descending order of communication amounts. A case in which the fairness control unit 16 converts the communication amount (for example, the number of packets, a data length, and an amount of data) collected by the statistical information management unit 13 into a band using the above monitoring cycle, to perform various calculations will be described, but the present invention is not limited thereto.

The fairness control unit 16 includes a limit target flow specifying unit 161, a number-of-limit-target-flows determination unit 162, and a band control unit 163.

When the sum of communication amounts of the respective flows in the above monitoring cycle exceeds the predetermined threshold value (for example, a line capacity of the communication line), the limit target flow specifying unit 161 specifies the top N flows in descending order of communication amounts as flows that are communication band limit targets. Here, a value of N is determined by the number-of-limit-target-flows determination unit 162.

Here, when the limit target flow specifying unit 161 specifies the limit target flows, the limit target flow specifying unit 161 may specify the limit target flows on the basis of the communication amount of each flow in the monitoring cycle or may specify the limit target flows on the basis of the communication band of each flow. That is, the limit target flow specifying unit 161 may perform limitation on the communication bands for the top N flows in descending order of communication amounts when the sum of communication amounts of the respective flows in the monitoring cycle exceeds the predetermined threshold value, and may perform limitation on the communication bands for the top N flows in descending order of communication bands when a sum of communication bands (inflow bands) of the respective flows exceeds a predetermined threshold value.

Further, the predetermined threshold value used by the limit target flow specifying unit 161 may be a value of the line capacity of the communication line itself or may be a value smaller than the line capacity of the communication line. For example, when the value smaller than the line capacity of the communication line is used as the predetermined threshold value, the fairness control unit 16 can perform the limitation on the communication band for each flow before 100% of the line capacity is used (in a state in which the communication line is tight).

Further, the limit target flow specifying unit 161 does not perform the limitation on the communication band when it is determined that the sum of the communication amounts of the respective flows in the monitoring cycle is equal to or smaller than the predetermined threshold value (for example, the line capacity of the communication line). Further, in a case in which the communication band of any of the flows has already been limited, the limit target flow specifying unit 161 instructs the band control unit 163 to release the limitation on the communication band of each flow when it is determined that the sum of the communication amounts of the respective flows is equal to or smaller than the predetermined threshold value.

Further, the limit target flow specifying unit 161 may specify the top N flows in descending order of communication amounts among flows with a communication amount exceeding a predetermined threshold value (a minimum guaranteed communication amount) among flows that are input to the communication line, as flows that are communication band limit targets. Thus, for example, when the top two flows in a communication amount are limited, a large amount of communication is performed in a first-ranked flow, and communication equal to or smaller than a normal amount is performed in a second-ranked flow, the limit target flow specifying unit 161 can set the second-ranked flow as a flow that is not a communication band limit target.

The number-of-limit-target-flows determination unit 162 determines a value of N (a number of limit target flows) that is used by the limit target flow specifying unit 161. For example, the number-of-limit-target-flows determination unit 162 sets a value obtained by dividing a difference between a predetermined line capacity and a sum of communication bands of the group of flows that are not communication band limit targets by N as a limited band of a group of limit target flows. The number-of-limit-target-flows determination unit 162 determines the value of N so that the limited band is equal to or larger than a communication amount of the flow having the largest communication amount in the group of flows that are not the communication band limit targets and is equal to or smaller than a communication amount of a flow having the smallest communication amount in the group of flows that are communication band limit targets.

For example, the number-of-limit-target-flows determination unit 162 sets the value obtained by dividing the difference between the predetermined line capacity and the sum of communication bands of the group of flows that are not communication band limit targets by N as a limited band of the group of limit target flows (that is, the top N flows in descending order of communication amounts). The number-of-limit-target-flows determination unit 162 determines the value of N so that the limited band is equal to or larger than a communication amount of the flow having the largest communication amount in the group of flows that are not communication band limit targets (satisfies the condition (1)) and is equal to or smaller than a communication amount of a flow having the smallest communication amount in the group of flows that are communication band limit targets (satisfies the condition (2)).

Specifically, the number-of-limit-target-flows determination unit 162 reduces the value of N when a limited band in a case in which the top N flows in descending order of communication amounts are set as the communication band limit targets is not equal to or larger than a communication amount of the flow having the largest communication amount in the group of flows that are not communication band limit targets. On the other hand, when the limited band is not equal to or smaller than the communication amount of the flow with the smallest communication amount in the group of flows that are set as communication band limit targets, the limit target flow specifying unit 161 increases the value of N. The number-of-limit-target-flows determination unit 162 increments or decrements such a value of N to search for a value of N that satisfies the above conditions (1) and (2). Details of the number-of-limit-target-flows determination unit 162 will be described below using a flowchart.

The band control unit 163 limits the communication bands of the flows (the top N flows in descending order of communication amounts) specified by the limit target flow specifying unit 161 to the limited band calculated by the number-of-limit-target-flows determination unit 162.

The limitation on the communication band of each flow in the band control unit 163, for example, may be performed by the control of the policer 15 or by the control of the shaper 17.

The shaper 17 performs shaping on input packets of the flow. For example, the shaper 17 performs shaping on the packets of the flow input from the policer 15. Shaped packets of the flow are output to the outgoing line.

[Processing procedures]

Figure 5:
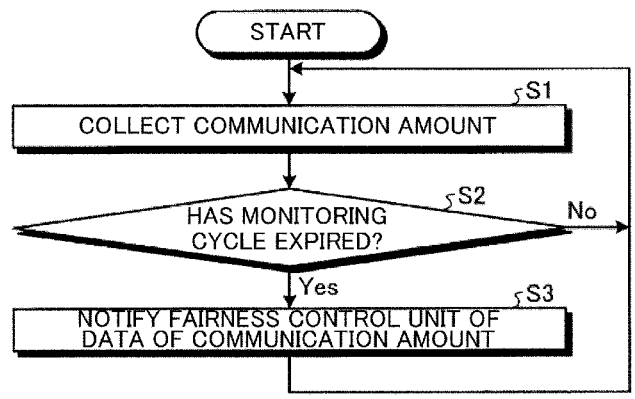
FIG. 5 is a flowchart illustrating an example of a processing procedure of a statistical information management unit in FIG. 3.
Figure 6:
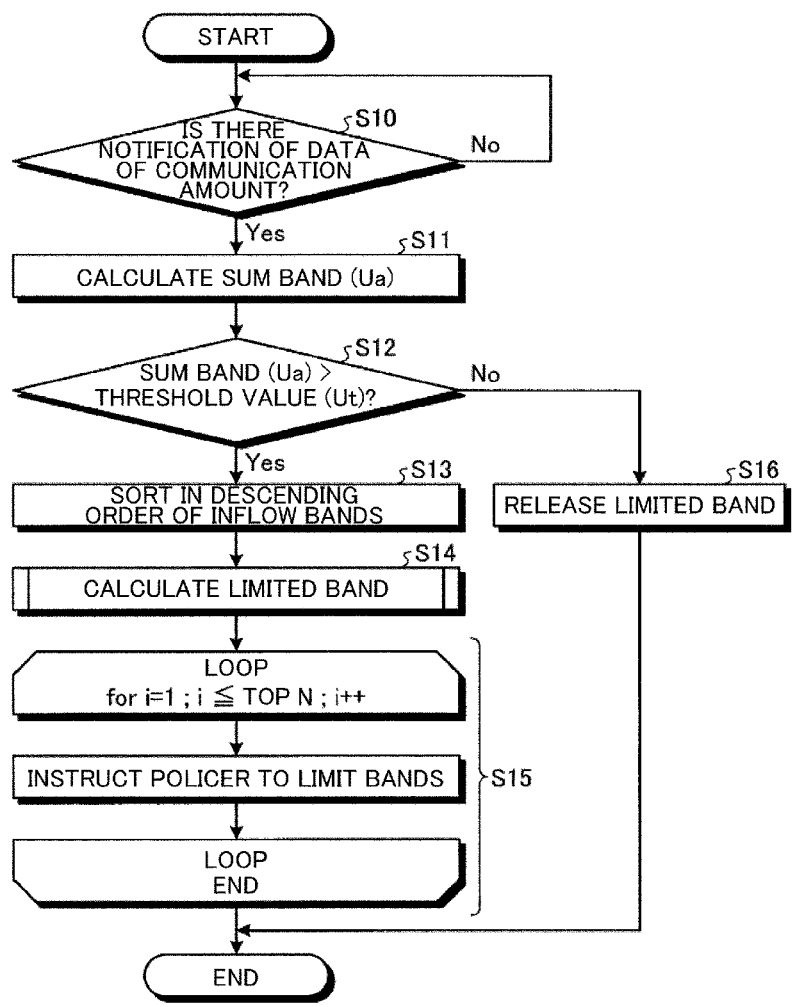
FIG. 6 is a flowchart illustrating an example of a processing procedure of a fairness control unit in FIG. 3.
Figure 7:
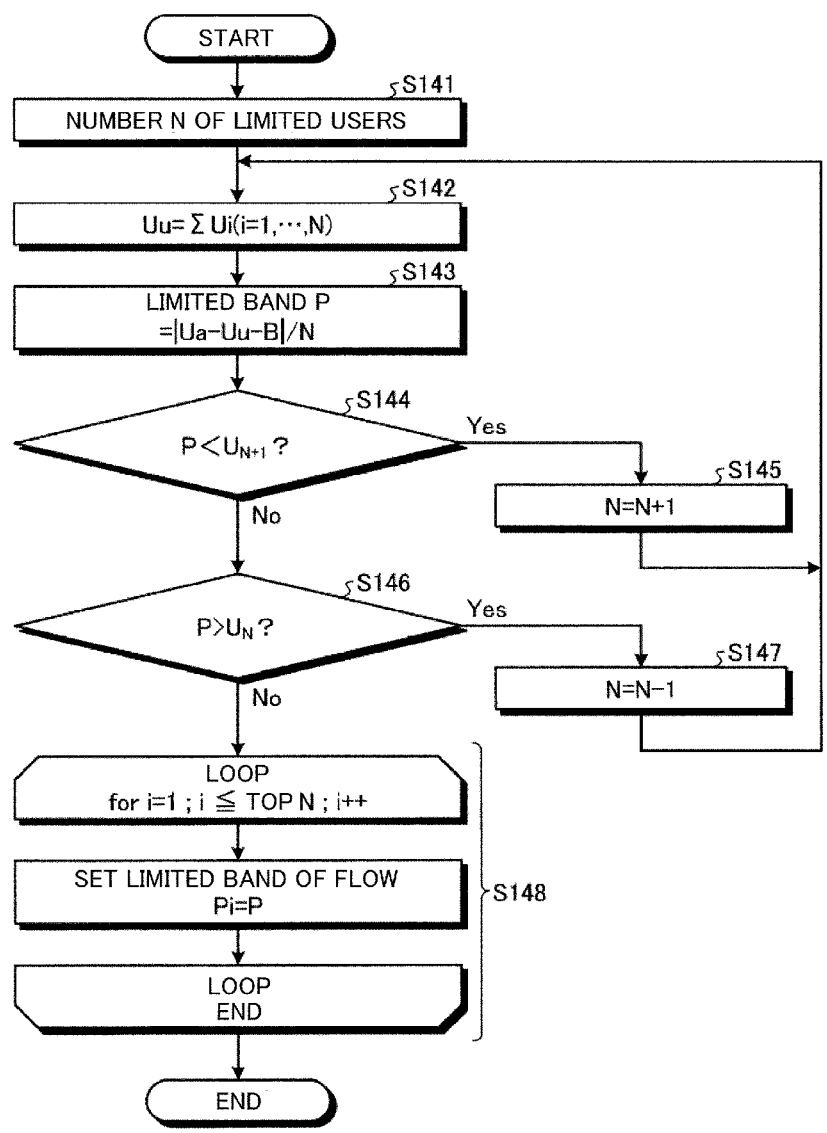
FIG. 7 is a flowchart illustrating an example of a processing procedure in S14 of FIG. 6.

Next, an example of processing procedures of the statistical information management unit 13 and the fairness control unit 16 of the communication control device 10 will be described with reference to FIGS. 5 to 7.

First, an example of the processing procedure of the statistical information management unit 13 will be described with reference to FIG. 5. The statistical information management unit 13 collects the communication amount of each flow using the counter 12 (S1). The statistical information management unit 13 records the collected data of the communication amount of each flow in the statistical information 131, for example. Then, when the statistical information management unit 13 receives the notification of the expiration of the monitoring cycle from the monitoring timer 14 (Yes in S2), the statistical information management unit 13 notifies the fairness control unit 16 of the data of the communication amount recorded in the statistical information 131 (S3). The statistical information management unit 13 then returns to S1. Further, in S2, the statistical information management unit 13 continues the processing of S1 before the statistical information management unit 13 receives the notification of the expiration of the monitoring cycle from the monitoring timer 14 (No in S2).

Next, an example of the processing procedure of the fairness control unit 16 will be described with reference to FIGS. 6 and 7. When there is a notification of the data of the communication amount of each flow from the statistical information management unit 13 (Yes in S10), the limit target flow specifying unit 161 of the fairness control unit 16 calculates a sum band (Ua) of the communication amounts of the respective flows (S11) and determines whether or not the sum band (Ua) exceeds a predetermined threshold value (S12). When there is no notification of the data of the communication amount of each flow from the statistical information management unit 13 (No in S10), the processing of the fairness control unit 16 returns to S10.

In S12, when the limit target flow specifying unit 161 determines that the sum band (Ua) of the respective flows exceeds the predetermined threshold value (Ut) (Yes in S12), the number-of-limit-target-flows determination unit 162 sorts the respective flows in descending order of inflow bands (S13). The number-of-limit-target-flows determination unit 162 calculates a limited band of each flow on the basis of a result of sorting the respective flows in S13 (S14). The band control unit 163 then instructs the policer 15 to limit the bands of the flows that are communication band limit targets to the limited band calculated in S14 (S15). The band control unit 163 ends the processing.

On the other hand, when the limit target flow specifying unit 161 determines in S12 that the sum band (Ua) of the respective flows is equal to or smaller than the predetermined threshold value (Ut) (No in S12), the band control unit 163 releases the band limit (S16). For example, the band control unit 163 instructs the policer 15 that is limiting the communication band of the flow to release the limitation on the communication band. The band control unit 163 ends the process.

[Limited Band Calculation Process]

Next, a process of calculating the limited band in S14 of FIG. 6 will be described in detail with reference to FIG. 7.

First, the number-of-limit-target-flows determination unit 162 sets the number N of limited users (the number of limit target flows) (S141). Here, as a value of N to be set, the value of N set in the previous monitoring cycle, for example, is used. The number-of-limit-target-flows determination unit 162 obtains Uu (a sum of the inflow bands of the top N flows in descending order of the inflow bands) using Formula (1) below (S142).

$$Uu = \Sigma Ui (i=1, \ldots, N) \qquad \text{Formula (1)}$$

Here, Ui: inflow band (actual value) of flow i

The number-of-limit-target-flows determination unit 162 then obtains a limited band P of each flow using Formula (2) below (S143).

$$\text{Limited band } P = |Ua - Uu - B|/N \qquad \text{Formula (2)}$$

Here, B: band of outgoing line

After S143, the number-of-limit-target-flows determination unit 162 determines whether or not the limited band P calculated in S143 is smaller than $U_{N+1}$ (S144). That is, the number-of-limit-target-flows determination unit 162 determines whether or not the limited band P is equal to or larger than $U_{N+1}$ (an inflow band of a flow having the largest inflow band among a group of flows that are not limit targets). Here, when the limited band P is smaller than $U_{N+1}$ (Yes in S144), the number-of-limit-target-flows determination unit 162 increments the value of N by 1 (S145) and returns to S142. On the other hand, when the limited band P is equal to or greater than $U_{N+1}$ (No in S144), the processing proceeds to S146. The number-of-limit-target-flows determination unit 162 determines whether or not the limited band P is larger than $U_N$ (S146). That is, the number-of-limit-target-flows determination unit 162 determines whether or not the limited band P is equal to or smaller than $U_N$ (the inflow band of the flow having the smallest inflow band in the group of the limit target flows). Here, when the limited band P is larger than $U_N$ (Yes in S146), the number-of-limit-target-flows determination unit 162 decrements the value of N by 1 (S147) and returns to S142. On the other hand, when the limited band P is equal to or smaller than $U_N$ (No in S146), the processing of the fairness control unit 16 proceeds to S148. The band control unit 163 sets a limited band Pi of the flow i (i=1, . . . , N). That is, the band control unit 163 sets the limited band P calculated in S143 as the limited band Pi (S148).

Thus, the fairness control unit 16 can appropriately perform limitation on the communication band of each flow in the best effort communication line. When the fairness control unit 16 executes the processing of S142 to S147 in FIG. 7 and the value of N becomes 0 or less, the fairness control unit 16 does not perform limitation on the communication band for any of the flows. Further, when the fairness control unit 16 executes the processing of S142 to S147 in FIG. 7 and the value of N becomes the same as the number of flows flowing into the communication line, the fairness control unit 16 sets all the flows as limit target flows.

[Program]

Further, a program that realizes the functions of the communication control device 10 described in the embodiment can be implemented by being installed in a desired information processing device (computer). For example, the information processing device can be caused to function as the communication control device 10 by causing the information processing device to execute the program provided as package software or online software. Examples of the information processing device referred to here include a desktop type or laptop type personal computer and a rack-mounted server computer. Further, a mobile communication terminal such as a smart phone, a mobile phone, or a personal handyphone system (PHS), and a personal digital assistant (PDA), for example, are included in the category of information processing devices. Further, the communication control device 10 may be mounted in a cloud server.

Figure 8:
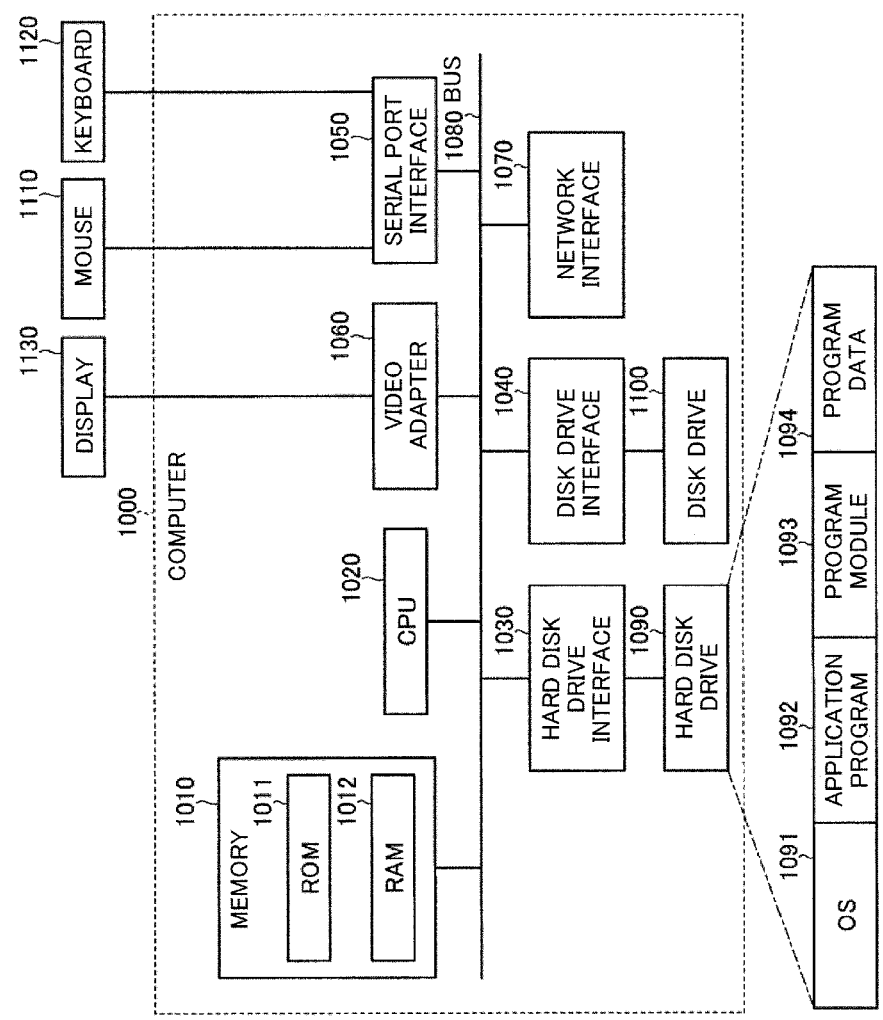
FIG. 8 is a diagram illustrating an example of a computer that executes a communication control program.
Figure 9:
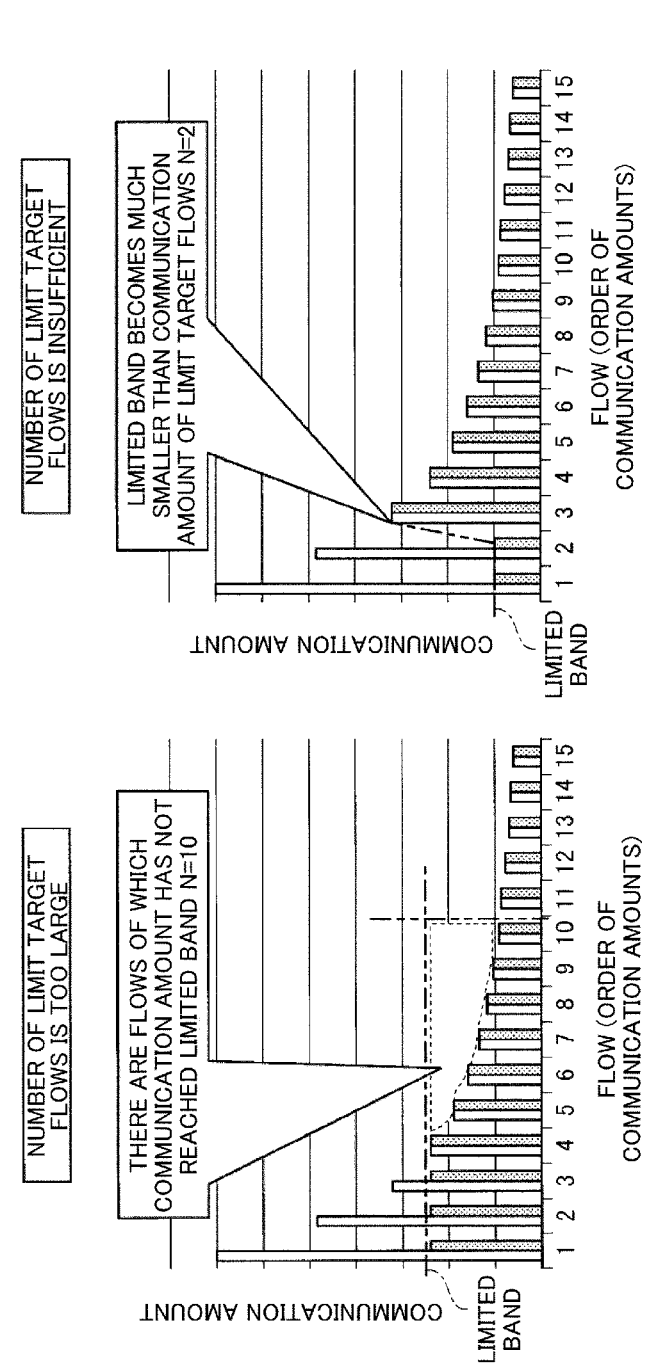
FIG. 9 is a diagram for explaining a problem in the prior art.

An example of a computer that executes the above program (control program) will be described with reference to FIG. 8. As illustrated in FIG. 8, a computer 1000 includes, for example, a memory 1010, a CPU 1020, a hard disk drive interface 1030, a disk drive interface 1040, a serial port interface 1050, a video adapter 1060, and a network interface 1070. The units are connected by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. A detachable storage medium such as a magnetic disk or an optical disc, for example, is inserted into the disk drive 1100. A mouse 1110 and a keyboard 1120, for example, are connected to the serial port interface 1050. A display 1130, for example, is connected to the video adapter 1060.

Here, the hard disk drive 1090 stores, for example, an OS 1091, an application program 1092, a program module 1093, and program data 1094, as illustrated in FIG. 8. The various types of data or information described in the above-described embodiment are stored in, for example, the hard disk drive 1090 or the memory 1010.

The CPU 1020 reads the program module 1093 or the program data 1094 stored in the hard disk drive 1090 into the RAM 1012, as necessary, and executes each of the above-described procedures.

The program module 1093 or the program data 1094 relevant to the control program is not limited to a case in which the program module 1093 or the program data 1094 is stored in the hard disk drive 1090, and for example, it may be stored in a detachable storage medium and read by the CPU 1020 via the disk drive 1100 or the like. Alternatively, the program module 1093 or the program data 1094 relevant to the program may be stored in another computer connected via a network such as a LAN or a wide area network (WAN) and read by the CPU 1020 via the network interface 1070.

REFERENCE SIGNS LIST

10 Communication control device
11 Distribution unit
12 Counter
13 Statistical information management unit
14 Monitoring timer
15 Policer
16 Fairness control unit
131 Statistical information
161 Limit target flow specifying unit
162 Number-of-limit-target-flows determination unit
163 Band control unit

The invention claimed is:

1. A communication control device for performing control of communication bands of flows, the communication control device comprising:
 a monitoring unit, including one or more processors, configured to monitor communication amounts for respective flows input to a communication line at a predetermined cycle;
 a flow specifying unit, including one or more processors, configured to specify top N flows in descending order of the communication amounts input to the communication line as flows that are communication band limit targets when a sum of the monitored communication amounts of the respective flows exceeds a predetermined line capacity, wherein N is a value equal to or greater than 2;
 a number-of-limit-target-flows determination unit, including one or more processors, configured to set a value obtained by dividing a difference between the predetermined line capacity and a sum of communication bands of a group of flows that are not the communication band limit targets by N as a limited band of a group of limit target flows, and determine a value of N so that the limited band is equal to or larger than a communication amount of a flow having the largest communication amount in the group of flows that are not the communication band limit targets and is equal to or smaller than a communication amount of a flow having the smallest communication amount in the group of flows that are the communication band limit targets; and
 a band control unit, including one or more processors, configured to limit a communication band of a group of the specified top N flows that are the communication band limit targets to the limited band.

2. The communication control device according to claim 1, wherein the number-of-limit-target-flows determination unit is configured to decrement the value of N when the limited band is not equal to or larger than the communication amount of the flow having the largest communication amount in the group of flows that are not the communication band limit targets, and increment the value of N when the limited band is not equal to or smaller than the communication amount of the flow having the smallest communication amount in the group of flows that are the communication band limit targets to determine the value of N.

3. A communication control method executed by a communication control device, the communication control method comprising:

a monitoring step of monitoring communication amounts for respective flows input to a communication line at a predetermined cycle;

a flow specifying step of specifying top N flows in descending order of the communication amounts input to the communication line as flows that are communication band limit targets when a sum of the monitored communication amounts of the respective flows exceeds a predetermined line capacity, wherein N is a value equal to or greater than 2;

a number-of-limit-target-flows determination step of setting a value obtained by dividing a difference between the predetermined line capacity and a sum of communication bands of a group of flows that are not the communication band limit targets by N as a limited band of a group of limit target flows, and determining a value of N so that the limited band is equal to or larger than a communication amount of a flow having the largest communication amount in the group of flows that are not the communication band limit targets and is equal to or smaller than a communication amount of a flow having the smallest communication amount in the group of flows that are the communication band limit targets; and a band control step of limiting a communication band of a group of the specified top N flows that are the communication band limit targets to the limited band.

4. The communication control method according to claim 3, wherein the number-of-limit-target-flows determination step comprises:

decrementing the value of N when the limited band is not equal to or larger than the communication amount of the flow having the largest communication amount in the group of flows that are not the communication band limit targets; and incrementing the value of N when the limited band is not equal to or smaller than the communication amount of the flow having the smallest communication amount in the group of flows that are the communication band limit targets to determine the value of N.

* * * * *